United States Patent [19]

Zeuch

[11] 4,049,373

[45] Sept. 20, 1977

[54] APPARATUS FOR PRODUCING COMPACT POLYCRYSTALLINE INP AND GAP INGOTS

[75] Inventor: Klaus Zeuch, Eckental, Germany

[73] Assignee: Siemens Aktiengesellschaft, Munich, Germany

[21] Appl. No.: 665,879

[22] Filed: Mar. 11, 1976

[30] Foreign Application Priority Data

Mar. 11, 1975 Germany .......................... 2510587

[51] Int. Cl.² ............................................ F27B 14/10
[52] U.S. Cl. .................... 432/265; 432/262; 23/273 SP; 164/134; 164/335; 266/275; 156/609
[58] Field of Search ............. 432/262, 264, 265, 253, 432/5, 6, 239, 156; 266/275; 23/273 SP; 156/609, 610, 616 R, 616 A; 164/134, 135, 335, 337

[56] References Cited

U.S. PATENT DOCUMENTS

| 454,759 | 6/1891 | Oden | 432/262 |
|---|---|---|---|
| 1,466,739 | 9/1923 | Nakamura | 432/265 |
| 2,593,015 | 4/1952 | Dreher | 432/262 |
| 2,773,923 | 12/1956 | Smith | 266/275 |
| 3,242,015 | 3/1966 | Harris | 23/273 SP |
| 3,277,006 | 10/1966 | Johnson et al. | 156/609 |
| 3,305,313 | 2/1967 | Sirgo et al. | 156/609 |
| 3,366,454 | 1/1968 | Folberth et al. | 156/616 A |
| 3,464,812 | 9/1969 | Utech et al. | 23/273 SP |
| 3,638,930 | 2/1972 | Hart, Jr. | 432/265 |
| 3,796,552 | 3/1974 | Robinson et al. | 432/263 |

Primary Examiner—John J. Camby
Assistant Examiner—Henry C. Yuen
Attorney, Agent, or Firm—Kenyon & Kenyon, Reilly, Carr & Chapin

[57] ABSTRACT

An apparatus for producing compact polycrystalline ingots of materials such as InP, GaP and GaAs having a defined geometric form is provided comprising a reaction boat having a plurality of melting pots formed therein, said melting pots having the shape of a single crystal melting crucible and at least one connecting canal communicating with said melting pots.

6 Claims, 3 Drawing Figures

APPARATUS FOR PRODUCING COMPACT POLYCRYSTALLINE INP AND GAP INGOTS

BACKGROUND OF THE INVENTION

This invention is concerned with an apparatus for producing compact polycrystalline ingots ot InP, GaP, GaAs and the like having a defined geometric form.

Single-crystals of InP and GaP are pulled from melted-down polycrystalline material of stoichiometric composition in vertical pulling apparatus. The material to be used for this purpose must first be brought into suitable form or comminuted.

Single-crystals of gallium phosphide, such as are required for the manufacture of light-emitting diodes, can be pulled from a gallium phosphide melt by the known protected melt process. The polycrystalline gallium phosphide required for the melt can be prepared directly from the elements. According to the method described therein, a gallium phosphide bar crystallizes in a trough-shaped boat if the melt is allowed to solidify with unidirectional orientation.

In contrast to the melting crucibles in single-crystal pulling equipment, the bars obtained in the synthesis of the polycrystalline material do not have circular cross section. To charge the melting crucible, the bars must therefore be broken into pieces, which are then melted down in a crucible of circular cross section under a $B_2O_3$ pellet. In this arrangement, however, the running of the $B_2O_3$ melt between the GaP pieces cannot be avoided. As a result, a muddy, opaque $B_2O_3$ protection melt is obtained after the first melting down. One must therefore prepare, prior to the crystal-pulling proper, in a separate operation called "regulus melting", a compact ingot of the semiconductor material, which has exactly the same shape as the melting crucible. The clear $B_2O_3$ melt, which is necessary for growing single crystals is obtained as a cover layer on the gallium phosphide melt, only after this second melting operation under a $B_2O_3$ pellet, in which the compact GaP ingot is employed.

SUMMARY OF THE INVENTION

It is an object of this invention to produce a suitable compact GaP material which yields in a single-crystal pulling apparatus under high nitrogen pressure in a quartz crucible, a transparent $B_2O_3$ melt floating on the GaP melt, which is necessary for single crystal growing in the first melting without an additional operation such as "regulus melting".

According to the invention, this object is accomplished by means of an apparatus, with which the compact polycrystalline AIIIBV ingots, e.g., GaP, InP and GaAs, are produced in exactly the same geometric form as the melting crucible of the single-crystal pulling equipment. According to the invention, this is achieved by the provision that the reaction boat which is used in the synthesis of the polycrystalline material, has melting pots which already have the form of the single-crystal melting crucible for growing the single crystals. According to a preferred embodiment of the apparatus, the melting pots are connected with each other in a reaction boat by at least one connecting canal, so that several ingots are simultaneously produced in one operation having the same dimensions as the melting crucible in the single-crystal growing equipment. For instance, compact GaP ingots of stoichiometric composition crystallize from a gallium phosphide melt rich in gallium with a continuous reaction in all the reaction boats. The free, unreacted gallium travels along the hot reaction zone through the connecting canal, as in a draining system. The gallium which collects in the last reaction boat can be used again in the first melting pot for the next synthesis. Based on several batches, nearly a 100% yield can be obtained.

Using the apparatus according to the present invention, compact ingots of preferentially circular cross section are produced in the synthesis of the polycrystalline material, with which it is possible to proceed with the growing of single crystals immediately after the first melting-down. Therefore the operation of the regulus and ingot melting is no longer necessary in the growing of the single crystals. Also the higher purity of the ingots should be noted particularly, as the material needs to be melted down only once and the mechanical comminution of the polycrystalline material is elminated. With optimized charging of the crucible, the batch size in single-crystal growing is also increased and the amount of $B_2O_3$ as well as the number of quartz crucibles per single crystal are reduced to one-half. With the apparatus according to the invention, it is also possible to produce compact formed bodies with defined geometric dimensions without mechanical processing in the preparation of GaP or InP of stoichiometric composition.

According to the invention, reaction boats with any melting pots that deviate from the cylindrical form can be used. However, reaction boats of circular cross section and cylindrical melting pots in the form of slightly conical bores have been found to be particularly advantageous.

To explain the invention in further detail, reference is made to the drawings.

DETAILED DESCRIPTION OF THE PREFERRED EMBODIMENT

Figure 1:
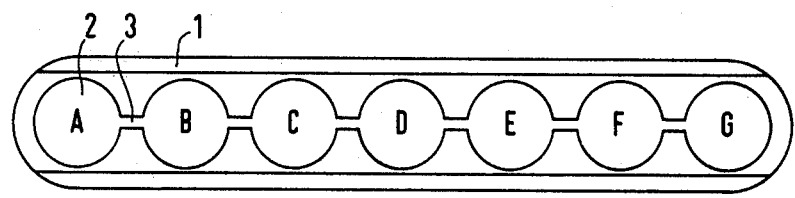
FIGS. 1 and 2 are top views of the apparatus of the invention.
Figure 2:
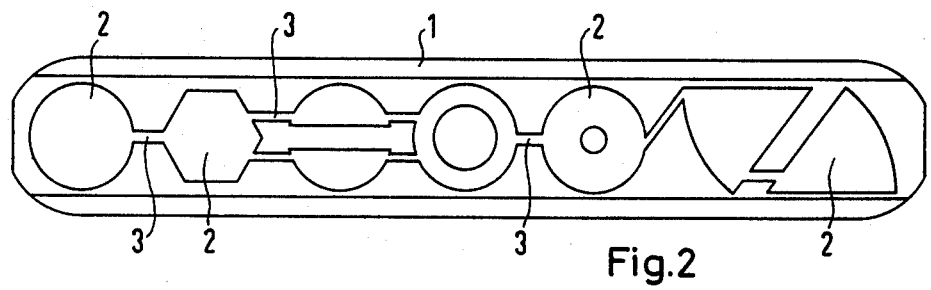

In the apparatus according to FIG. 1, a reaction boat of graphite is employed in which several circular holes 2, tapered toward the bottom, called melting pots, are milled one behind the other. These holes 2, designated in FIG. 1 by A to G, have the dimensions of the melting crucible from the single-crystal pulling equipment (not shown). However, their form and size may also be different from each other, as illustrated in FIG. 2. The holes 2 are connected via a connecting canal 3 in such a manner that the free, unreacted gallium can travel along the hot reaction zone through the canal up into the last crucible G. The connecting canal is the prerequisite to the crystallization of the circular, single-phase GaP ingots in the individual crucibles A to F, although in the molten state the crucible-shaped melting pots are filled with a GaP melt which is rich in gallium.

The invention will be more fully described in the following examples.

EXAMPLE 1

Figure 3:
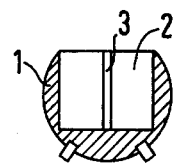
FIG. 3 illustrates a cross-section of the apparatus.

Into a round graphite bar (length, 300 mm; diameter, 50 mm), seven holes 2 (FIG. 3) with an upper diameter $d_1 = 36$ mm, a lower diameter $d_2 = 34$ mm and a height $H = 30$ mm are milled, so that the seven downward-tapered crucibles A to G lie in one plane, as shown in FIG. 1. The crucibles are connected to each other by a connecting canal (3) 3 mm wide, which serves as a drain for drawing off the free gallium. A total of 630 g gallium are filled into the holes, which in the molten state is uniformly distributed over the seven crucibles A to G.

The graphite boat 1 is heated by means of induction heating to a temperature of 1250° C for the GaP synthesis in the region of the crucibles A and B, at which the gallium therein is saturated with phosphorus from the phosphorus vapor present above the boat at a pressure of 10 bar. During the subsequent continuous shift of the hot reaction zone from the region of the crucibles A and B to the region of the crucibles B and C, a compact, cylindrical GaP ingot of stoichiometric composition crystallizes in the crucible A from a GaP melt rich in gallium, because the free, unreacted gallium has travelled from the crucible A into the crucible B through the connecting canal 3 with the hot reaction zone, as in a drainage system. With the reaction advancing, six pieces of compact, stoichiometric GaP ingots are obtained in crucibles A to F. The ingot from the crucible G, where the free gallium has quantitatively collected, can be used again for the next synthesis in crucible A, and almost a 100% yield, based on several batches, can be obtained thereby.

After knocking or grinding off the connecting stems between the individual ingots, the latter, with a net weight of 120 to 130 g of polycrystalline GaP, can be melted down in a vertical melting crucible under $B_2O_3$ for the growing of single crystals. The $B_2O_3$ melt under the GaP melt is clear and transparent and the growing of the single crystal with an immersed seed can take place after the first melting-down.

EXAMPLE 2

In the same graphite boat as used in Example 1, 840 g indium were weighed in, which yielded in the InP synthesis, six pieces of compact InP ingots of stoichiometric composition at a weight of 140 to 150 g, with the reaction zone inductively heated to 980° C and a phosphorus vapor pressure of 10 bar.

What is claimed is:

1. An apparatus for use in producing compact polycrystalline InP, GaP and GaAs ingots of defined geometric form comprising an elongated reaction boat having a plurality of melting pots, each of the shape of a single crystal melting crucible in which said ingots are to be further processed, formed therein, said plurality of melting pots arranged in a line and, a canal between each two adjacent melting pots extending over essentially the full height thereof, whereby said melting pots can be filled with indium or gallium, the reaction boat disposed in zone melting apparatus, heated in a narrow zone in an atmosphere staurated with phosphorous or arsenic and the zone moved from one end to the other to form ingots in succession with free indium or gallium migrating to the other end and available for reuse.

2. The apparatus of claim 1 wherein the melting pots have the same geometric form and dimensions.

3. The apparatus of claim 1 wherein the melting pots have different forms.

4. The apparatus of claim 1 wherein the melting pots have different dimensions.

5. The apparatus of claim 1 wherein the reaction boat and the melting pots have a circular cross-section.

6. The apparatus of claim 1 wherein the reaction boat is comprised of graphite.

* * * * *